United States Patent [19]

Netto

[11] 4,254,933
[45] Mar. 10, 1981

[54] MOLD FOR INJECTION MOLDING

[76] Inventor: Eduardo D. L. C. Netto, Rua Sao Luiz Gonzaga 912, Rio de Janeiro, Brazil

[21] Appl. No.: 107,010

[22] Filed: Dec. 26, 1979

[51] Int. Cl.³ .......................... B29C 1/00; B29F 1/00
[52] U.S. Cl. .................................. 249/103; 425/169; 425/182; 425/190; 425/525; 425/542
[58] Field of Search .............. 249/102, 103, 107, 110; 425/169, 171, 182, 190, 525, 542

[56] References Cited

U.S. PATENT DOCUMENTS

| | | | |
|---|---|---|---|
| 3,354,509 | 11/1967 | Ammordson | 249/103 X |
| 4,036,926 | 7/1977 | Chang | 425/525 |

*Primary Examiner*—J. Howard Flint, Jr.
*Attorney, Agent, or Firm*—Beveridge, DeGrandi, Kline & Lunsford

[57] ABSTRACT

A mold for injection molding of plastic articles which are automatically numbered or coded without repeating the combinations. In accordance with the invention one half of the mold comprises concentric rings rotatable about a reference axis perpendicular to the mold surface, the rings forming portions of the mold cavity in equally spaced positions about said reference axis, each ring presenting in the interior of each cavity a marking that is different from those that it presents to the other cavities, means for rotating one of said rings by increments so that its markings are presented, one by one, to said cavities, and for rotating each other ring by an increment each time the previous ring completes a revolution, in a manner similar to a mechanical counter, and actuating means to actuate said rotating means by an increment for each cycle of separation and approximation of said mold halves.

15 Claims, 6 Drawing Figures

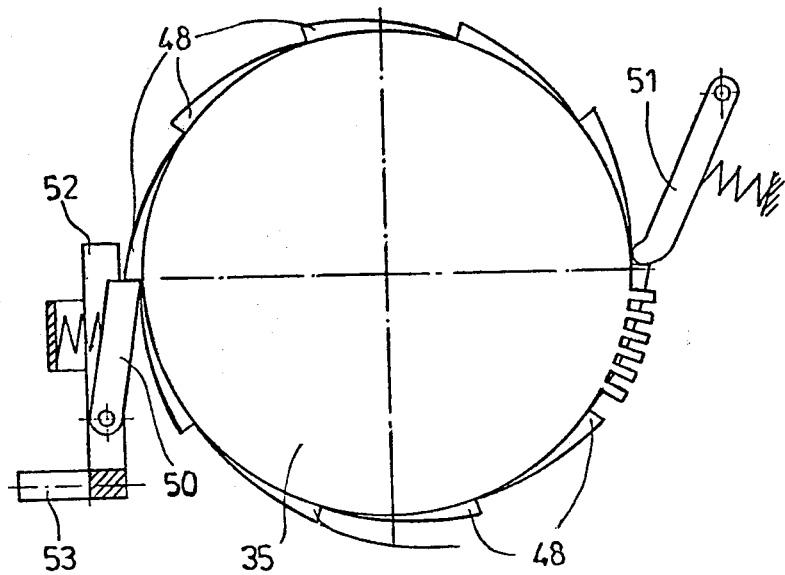
FIG. 4
FIG. 5
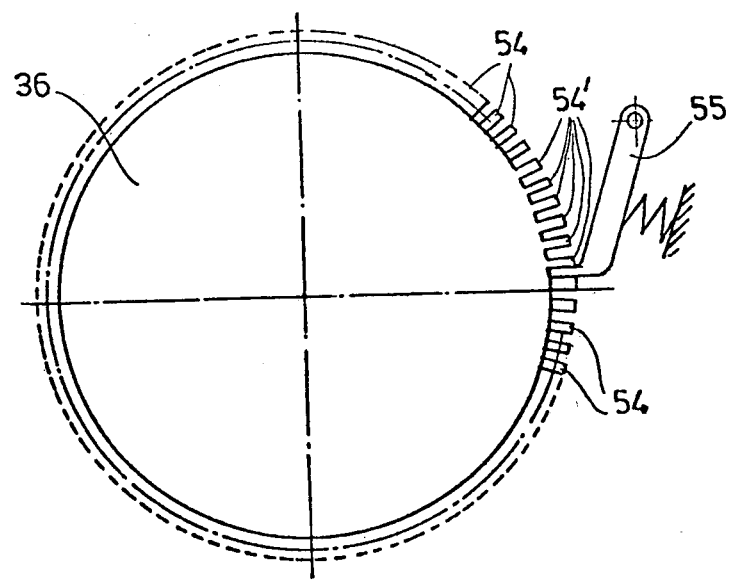

MOLD FOR INJECTION MOLDING

The present invention relates to the injection molding of plastic articles numbered or codified in some other way, using a multiple cavity mold.

A mold is already known in which the cavities are arranged in a row and are traversed by hardened steel bands appropriately engraved with numbers or letters so that each band presents a number or a letter to each cavity. The bands are continuous, moving around suitable wheels provided at the ends of the mold, whereas the return portions of the bands do not pass through the cavities, but rather behind the mold. Between each molding operation the bands are moved to present the next number or letter to the cavities. This type of mold has various disadvantages including a compex system for actuating the bands, which is partly hydraulic, partly eletromagnetic and partly mechanical. Sequential numbering or codification of the produced articles is taken into consideration when engraving and controlling the bands.

The object of the present invention is to provide a simplified and extremely efficient mold to make multiple moldings, producing numbered or codified articles and, in a preferred embodiment, without repeating the combination—to the highest possible number—but without taking into consideration the sequential production thereof.

According to the present invention a mold for injection molding comprising two halves of a mold separable after each molding operation and having mating surfaces which define therebetween a plurality of molding cavities and injection channels opening into said cavities, is characterized by the fact that it comprises concentric rings in a first of said mold halves, rotatable about a reference axis perpendicular to said mating surfaces and forming portions of said cavities in positions equally spaced around the reference axis, each ring presenting to the interior of each cavity a marking that is different from those it presents to the other cavities, means to rotate one of said rings by increments so that its markings are presented, one by one, to said cavities and for rotating each other ring by an increment each time the previous ring completes a revolution, in a manner similar to a mechanical counter, and actuating means to actuate said rotating means by an increment for each cycle of separation and approximation of said mold halves.

Preferably, the rings—every one of which may be provided with marking in the form of numbers or letters sequentially distributed around it—are fitted and tightened against each other when the two mold halves are brought together to place their mating surface in contact with each other.

In order to make sure that there is no repetition of number or letter combinations between the cavities, each cavity is already provided with an engraved number or letter which does not move with the rings. In this manner the mold can produce, without repetition, the highest possible number of combinations using the marking existing on the rings and the cavities.

In the preferred embodiment of the invention the mold has ten cavities traversed by six rings each one of them engraved with the numbers 0, 1, 2, 3, 4, 5, 6, 7, 8 and 9 or with the letters A, B, C, D, E, F, G, H, I and J, all the zeros, all the ones, etc., being positioned at the start of the production in a line along radii extending from said reference axis in the direction of the cavities already permanently engraved with the numbers 0, 1, 2, ... 9 respectively. Therefore, in the first molding operation, the ten articles produced are numbered 0000000, 1111111, ... 9999999, the first number being the one permanently engraved in each cavity and the others those of the rings.

Preferably, the first ring to rotate is the one that produces the second number of the series (the first being the fixed one) so that in the next molding operation the ten articles produced shall be numbered 0100000, 1211111, 2322222, ... 9099999. When the first cavity is already producing 0900000 and the last one 9899999, the next cycle of opening and closing the mold will also move, by one increment, the second ring, so that articles shall be produced with the numbers 0010000, 1121111 ... 9909999.

The result of using a numbering system of this type is that there are no repetitions of the combinations until ten million articles have been produced numbered 0000000 to 9999999. Furthermore, the articles are being produced without a numerical sequence, but without repetitions, which is of great value when the articles are to be used in security and it is undesirable for third parties to know beforehand the numbers of the next production in a series. This is of great advantage in the production of security seals, for instance such as those described in the U.S. Pat. No. 4,106,801.

The invention will now be described in greater detail with reference to the accompanying drawings, in which:

FIG. 4 is a bottom view of the drive geat of the outer ring of the mold half shown in FIG. 3;

FIG. 5 is bottom view of one of the other gears; and

Figure 2:
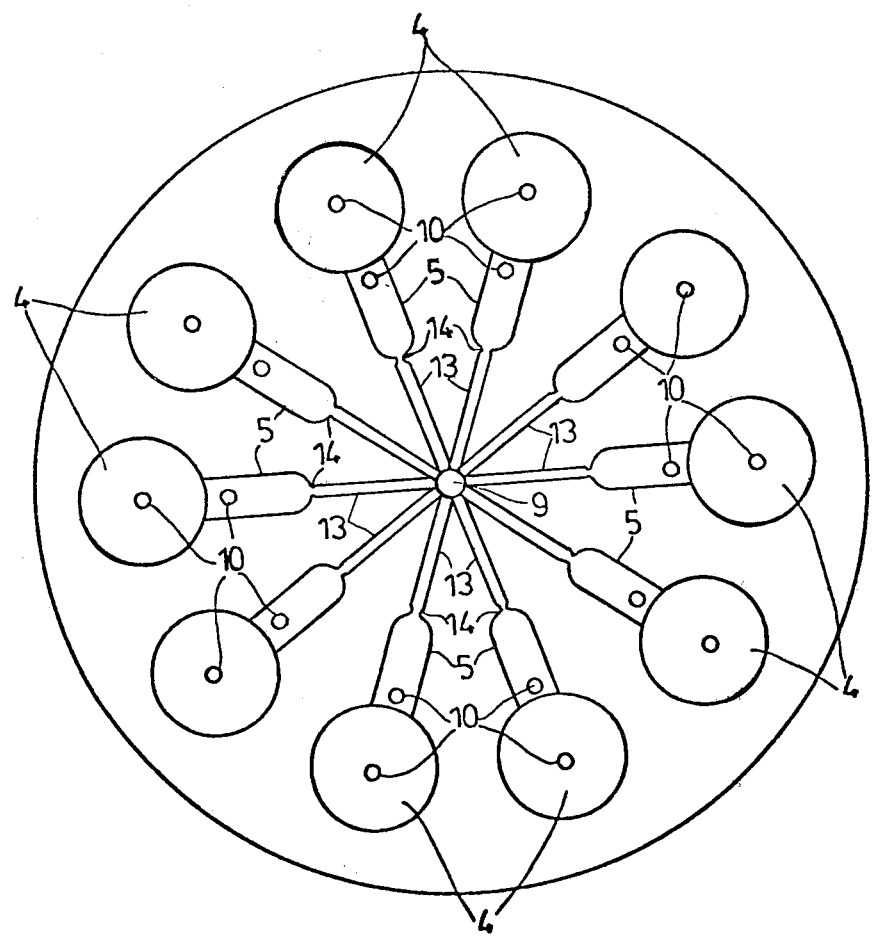
FIG. 2 is a plan view of the face of one half of the mold shown in FIG. 1.

With reference to the drawings which show a preferred embodiment of the invention, a circular injection mold comprises two circular mold halves 1 and 2 having mating faces at 3 and defining there between ten cavities 4 (machined in half 1) for molding numbered labels. As better shown in FIG. 2, the cavities 4 define blade forming parts 5 which are disposed radially round the center of the mold.

The mold half 1 is the movable part when mounted on the injection machine and the half 2 is stationary and has a nozzle for central injection 6. The half 1 is formed with an internal cavity 7 provided with a sliding plate 8 from which a main ejector pin 9 and ten pairs of secondary ejector pins 10 project which pass with precision though corresponding holes in half 1 as far as its face. The main ejector pin 9 is aligned with the injector nozzle 6 in the other half 2 of the mold whereas the two ejectors 10 of each pair of secondary ejectors enter a corresponding cavity 4.

The ejector carrier plate 8 is itself mounted on a metal part 11 which passes through a hole in the rear plate 12 of the mold half 1 where it is provided with a head 12a whose diameter is bigger than that of said hole and is held away from plate 12 by a spring.

The face of mold half 1 is formed with ten channels or grooves 13 starting from the end of the hole traversed by the main ejector pin 9, each channel 13 ending at a restriction 14 where it enters the blade forming parts of the corresponding cavity 4.

Reverting to the second half 2 of the mold, it has a sandwich structure, comprising a front portion which defines the face, an intermediate portion where the numbering mechanism is mounted and a rear or base portion which is connected with the injection system of the injection machine (not shown). The front portion comprises an outer ring 15 provided with an outer flange 16 for an exact positioning of the other half 1 of the mold, and a smooth flat face mating with the face of half 1. Around the inner border of this smooth face the ring 15 is formed with ten small cavities where part 5 of each cavity 4 machined in the other half 1 begins. Elements 17 individually engraved with the numbers of the cavities (0, 1, 2, 3, 4, . . . 9), are firmly placed in such small cavities.

Figure 3:
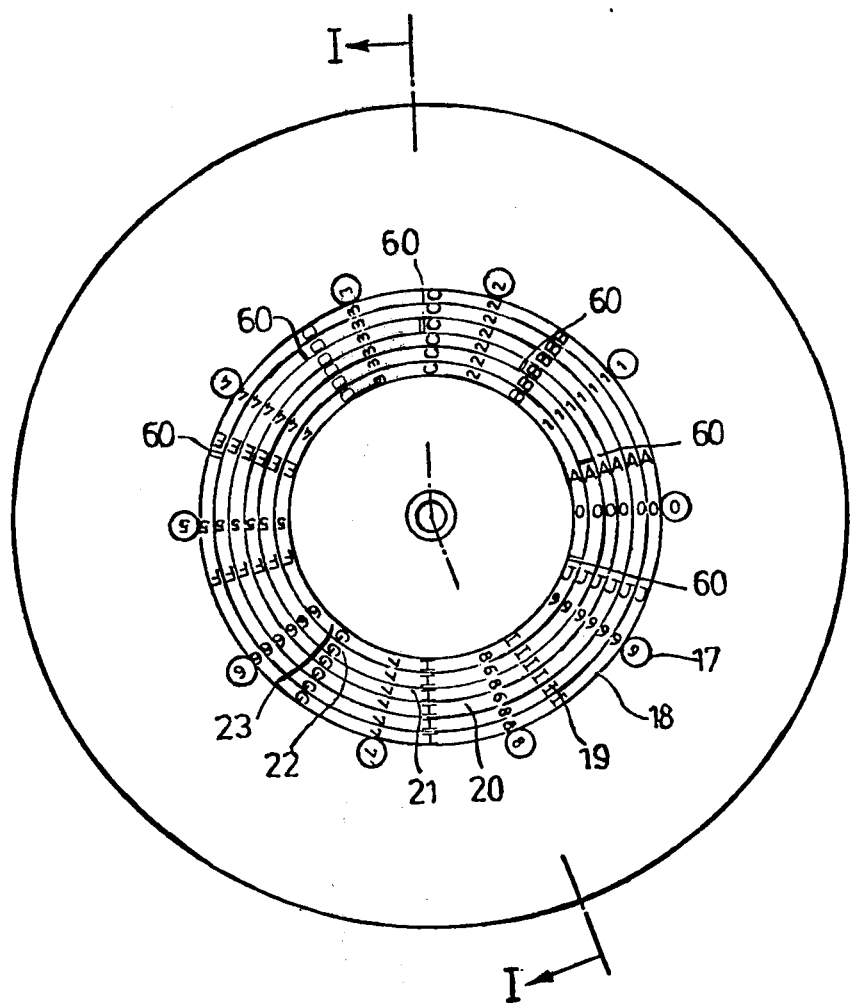
FIG. 3 is a plan view of the face of the other half of the mold shown in FIG. 1.

Inside the ring 15 there are six thin cylindrical rings 18, 19, 20, 21, 22 and 23 radially split at 60, as shown in FIG. 3. The innermost ring 23 is formed with an internal conical lip 24 which cooperates with a frusto-conical member 25 which completes the front portion of half 2. All of rings 18 to 23 are engraved at equal angular intervals with the ten numbers 0, 1, 2, 3, 4, 5, 6, 7, 8 and 9 so that when correctly alegned, the rings together with the engraved elements 17 make up combinations composed of seven numbers along the radial lines corresponding to parts 5 of the cavities 4 (see FIG. 2).

Frusto-conical member 25 has a central bore having cylindrical and conical parts separated by a step 26. The conical part and the step 26 correctly position the inner end of the injector nozzle 6 when the mold is closed, the step 26 serving also to support one end of a compression spring 27. The intermediate part of the mold half 2 includes, fixed to the base plate 28 by three screws 29 (only one being visible in FIG. 1), a support member 30 having a two diameter bore, that is, a lower portion with a smaller diameter and an upper portion with a bigger diameter, separated by an internal flange 31.

The other (lower) end said compression spring 27 presses against the upper surface of flange 31, whereas the head of the injector nozzle 6 is held in said greater diameter portion of the bore in support member 30. The conical member 25—biased outwardly by spring 27—has its movement limited by three screws 32 (only one being visible in FIG. 1) whose heads freely enter the cavities 33 in support member 30.

The said intermediate part of the mold half 2 includes as well an outer ring 34 fixed between the base plate 28 and the outer ring 15 of the front part. Said ring 34 is spaced from support member 30 to define an annular space containing six gears 35, 36, 37, 38, 39 and 40 provided with central sleeves projecting upwardly, and having diameters identical to those of the corresponding rings 18, 19, 20, 21, 22 and 23. Sleeves 35 to 40 are coupled with the corresponding rings 18 to 23 by means of pins projecting downwards from each ring which penetrate small radial slits in the corresponding sleeves which permits a limited expansion or contraction of the ring which is split at 24 (FIG. 3). The gears 35 to 40 which are susceptible to rotation in relation to each other round the support member 30, cooperate in a manner that will be described later, with a group of five identical toothed sprockets 41, 42, 43, 44 and 45 mounted one on top of the other on a bearing pin 46 fixed to base plate 28 by a screw 47. The set of sprockets is housed in a cavity in ring 34, outside the space where the gears are housed.

The upper gear 35 which drives the outer split ring 18 is shown from below in FIG. 4, where it can be seen that it is provided with ten ratchet teeth 48 so that the rotation of the gear through an angle corresponding to the pitch of the teeth will move the numbers engraved on the ring 18 from one cavity 5 to another. However, the ratchet teeth 48 are formed only in the upper half of the gear 35, the lower part being free of teeth with the exception of six gear teeth 49 through an angle limited by the pitch of the ratchet teeth 48.

The ratchet teeth 48 cooperate with two diametrically opposed pawls 50 and 51 of which pawl 51 fixes the gear in each position and pawl 50 drives the gear by means of a slide 52 in its turn driven by a lever 53 integral therewith. The two pawls 50 and 51 and the slide 52 are duly mounted in appropriate cavities in the outer ring 34 of the intermediate portion of mold half 2, the lever 53 projecting radially outwardly therefrom.

The six teeth 49 of the gear 35 cooperate once for every rotation thereof, with the upper half of the toothed wheel 41. Each on of the toothed wheels has 40 teeth so that at the end of each revolution of the gear 35 the teeth 49 rotate the wheel 41 a fraction of a revolution.

FIG. 5 is a bottom view of the second gear 36. It has eighty teeth 54 of which only six, indicated by reference 54', have the complete height of the gear. The teeth 54 have the same pitch as teeth 49 and mesh permanently with the lower half of the teeth of toothed wheel 41 so that for each increment of the revolution of wheel 41, gear 36 and its corresponding ring 19 are rotated one tenth of a revolution. The lower half of the six teeth 54' mesh with the upper half of the next toothed wheel 42 whose lower half meshes permanently with the upper part of the next gear 37. This gear and also gears 38 and 39 are identical to gear 37 except for their internal sleeves which have progressively smaller diameters, whereas gear 40, being the last and not being required to cooperate with two wheels, is only provided with teeth of maximum height.

Each one of the gears 35, 36, 37, 38, 39 and 40 is also associated with a corresponding spring biased pawl 55, which cooperates with the teeth 54 to aline and steady the corresponding gear and numbered ring after each incremental advance. These four pawls 55 are alined vertically below pawl 51 of the ratchet wheel 35, all being mounted on the same pin.

Figure 6:
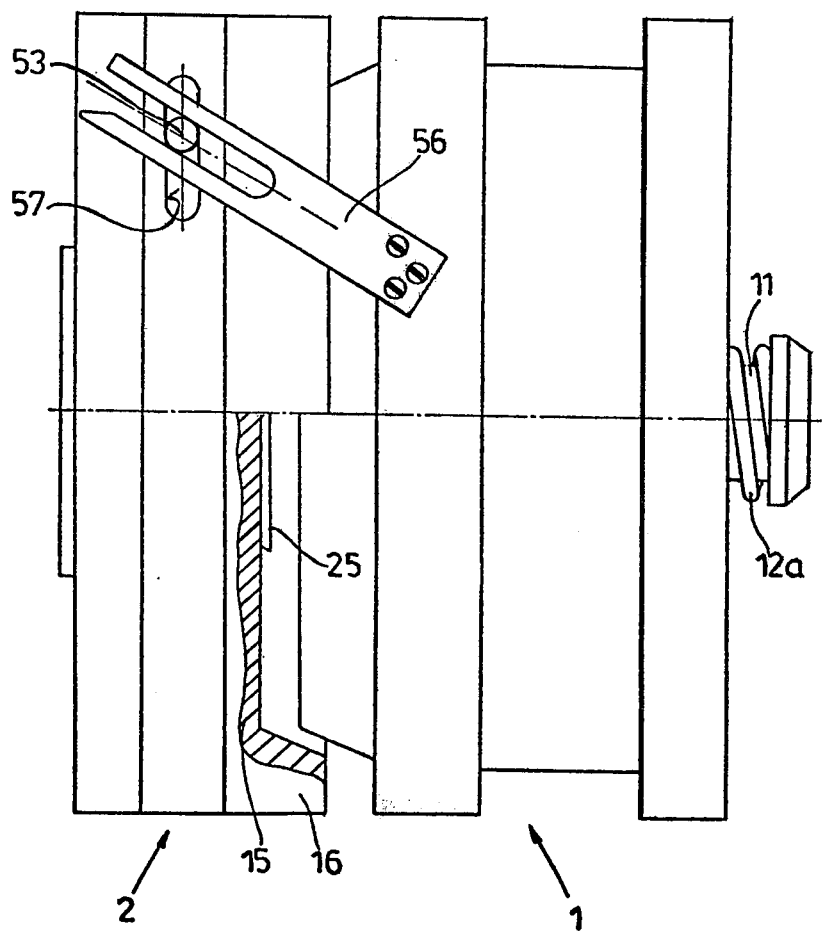
FIG. 6 is a side view of the mold in a semi-open position.

Finally to complete the description of the mold structure, the upper half 1 is provided, at its outer wall, with a two pronged fork 56 extending in the general direction of mold half 2, but inclined with respect to the axis of the mold. As shown in FIG. 6, fork 56 serves as an actuating member for lever 53, moving it to the left in a slot 57 in ring 34 of the intermediate portion of the mold half 2 when the mold is closing and to the right when the mold is opening. This assures that for each opening and closing cycle of the mold, the ratchet wheel 35 is rotated by the pitch of one its teeth 48.

Considering now the operation of the mold in the position shown in FIGS. 1 to 6, that is to say with the mold closed and the various cavities 4 with their parts 5 associated with numbers identical to those of the various rings 17–21 (0000000, 1111111, . . . 9999999), the injection of the plastic is made through the nozzle 6. The melted plastic injected through nozzle 6 is distributed along the ten radial channels 13 and through the restrictions 14 to fill the ten cavities 4 and thus to mold ten labels numbered with said combinations 0000000, 1111111, 2222222, . . . 9999999. When the injection is over, the injection machine (not shown) separates mold half 1 from mold half 2, permitting the conical element 25 (see FIG. 6) to project beyond the face of mold half 2 due to the force of compression spring 27. This movement is only limited by the heads of the three screws 32 which abut against the bottom of the cavities 33. Under these conditions, the rings 18 to 23—split at 60 (FIG. 3)—become relatively loose and, anyway, susceptible to rotation with respect to the other.

At the same time, during the opening of the mold, the lever 53 is moved to the left by the fork 56 (see FIG. 6), which advances pawl 50 (FIG. 4) and rotates ratchet 35 one tenth of a revolution or the pitch of one tooth 48. At the same time pawl 51 also meshes with the next tooth 48 on the other side of the gear, holding it against undersirable movements. This rotation of one tenth of a revolution of the gear 35 also results in an identical revolution of the outer ring 18, so that its number 0 advances into cavity no. 1, its number 1 advances into cavity no. 2 and so forth. The next combinations will therefore be 0100000, 1211111, 2322222, 3433333, 4544444, 5655555, 6766666, 7877777, 8988888 and 9099999.

Just before the mold reaches its fully open position, the head 12a of part 11 strikes a fixed part of the injection machine, which impells the ejector carrier plate 8 forwardly in the direction of the mold face, projecting the ends of the ejector pins 9 and 10 beyond the face of the half 2 to eject the molded articles and the injection trimmings from cavities 4 and channels 13.

Figure 1:
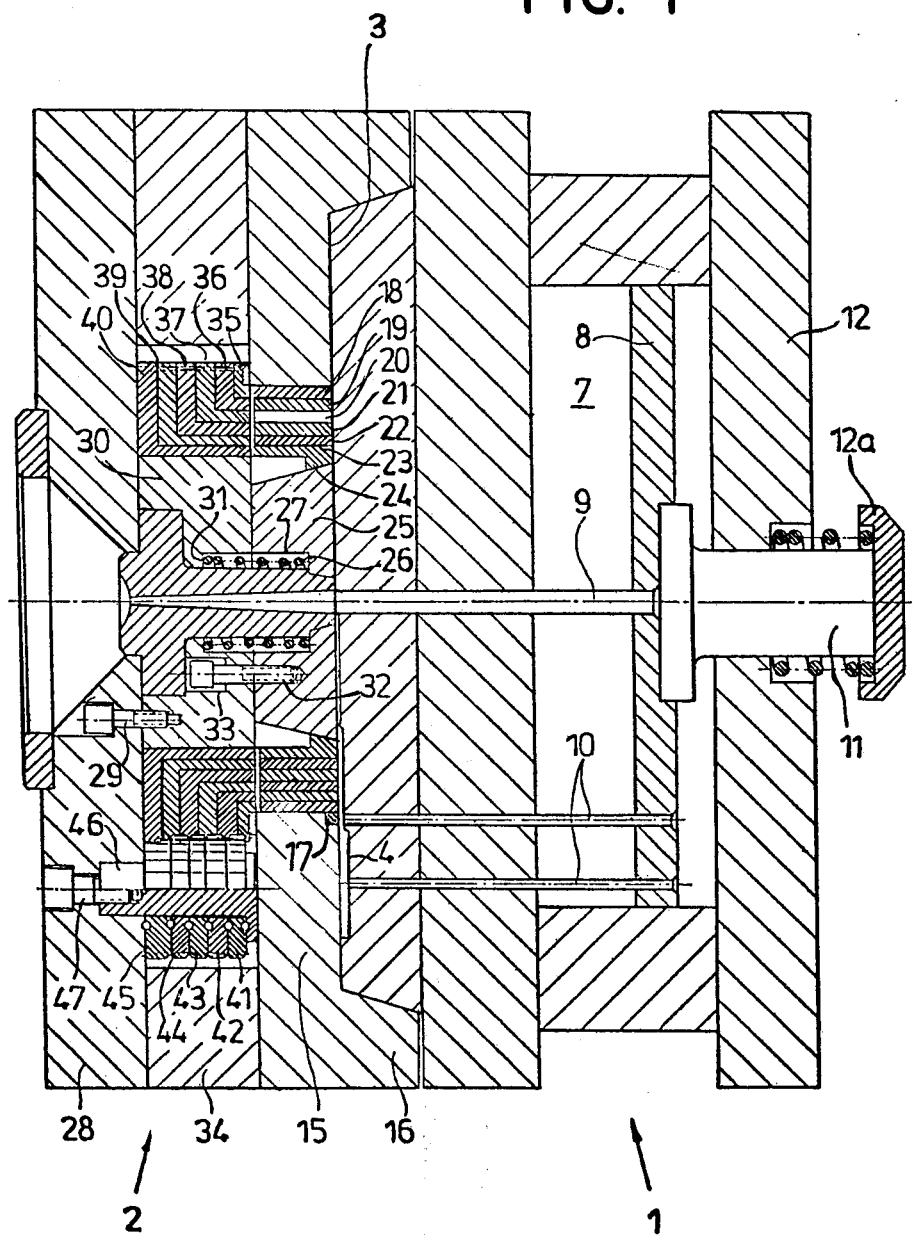
FIG. 1 is a cross section view of a mold constructed accordding to a preferred embodiment of the invention, taken along line I—I of FIG. 3.

At the end of the closing movement of the mold, the face of the mold half 1 strikes the conical member 25 forcing it back against the elastic force of spring 27 and to assume the configuration shown in FIG. 1. This expands rings 18 to 23, ensuring that they are tightly fitted to each other, with no spaces or intervals causing the formation of burrs during the next injection.

Up to the tenth injection, when the number combinations produced go as high as 0900000, 1011111, 2122222, . . . 9899999, the operation of the mold is simply repeated. However, when the mold is opened after the tenth injection, the rotation (one tenth of a revolution) of the gear 35 causes the teeth 48 to cooperate with the toothed upper wheel 41 which transmits the rotation of one tenth of a revolution to the second gear 36. As a result, the numbered ring 18 returns to its initial position and the next ring 19 is simultaneously moved to pass its numbers from one cavity to another. This means that the eleventh injection will produce the following combinations: 0010000, 1121111, 2232222, 3343333 . . . 9909999.

Consequently the continuation of the injection cycles will permit one to produce ten million combinations (0000000 to 9999999) without repetition and without having the appearance of a serial production.

Although the above mentioned mold uses numbers in its marking rings 18 to 23, it small be understood that letters or other type of identification would also be possible. Furthermore, FIG. 3 shows an alternative in which the ten numbers are used intermittently with the letters A, B, C, D, E, F, G, H, I and J. Therefore, a small relative rotation of rings 18 to 23 in relation to their gears 35 to 40 and the substitution of the elements 17 for others engraved with letters, is sufficient to convert the number combinations into letter combinations.

It will also be understood that the number of cavities 4 was limited to ten only because of the decimal system. In a mold of, say, eighteen cavities, it is possible to use rings with eighteen letters (A to R) in which case the gear of the ratchet 35 would have to have eighteen teeth 48, whereas the teeth 49 and the gears 39 to 40 would have to be properly associated for the purpose of transmitting among themselves fractions of one eighteenth of a revolution.

It would also be possible to make the presently described mold with twenty cavities, the rings having the alfa-numeric engravings shown in FIG. 3, so that all combinations of the ten letters or numbers could be used without repetition.

These and other modifications of the presently described preferred embodiment will be obvious to a person versed in the art as also will other variations within the spirit of the invention which is limited only by the following claims.

I claim:

1. In a mold for injection molding comprising two mold halves separable after each molding operation and having mating surfaces which define therebetween a plurality of molding cavities and injection channels opening into said cavities, the improvement comprising concentric rings in a first of said mold halves, rotatable about a reference axis perpendicular to said mating surfaces and forming portions of said cavities in positions equally spaced about the reference axis, each ring presenting to the interior of each cavity a marking that is different from those that it presents to the other cavities, means to rotate one of said rings by increments so that its markings are presented, one by one, to said cavities and to rotate each other ring by an increment each time the previous ring completes a revolution, in a manner similar to a mechanical counter, and actuating means to actuate said rotating means by an increment for each cycle of separation and approximation of said mold halves.

2. A mold according to claim 1, in which said concentric rings are fitted and tightened against each other when the two halves of the mold are approximated with their mating surfaces in contact with each other.

3. A mold according to claim 2, in which said rings are expandable, being in an expanded state when the mating surfaces of the two halves of the mold are in contact with each other.

4. A mold according to claim 3, in which said rings are in an unexpanded state when the two halves of the mold are separated from each other so as to facilitate their relative rotation.

5. A mold according to claim 4, in which it comprises means to expand said rings when the two halves of the mold are approximated.

6. A mold according to claim 5, in which said means for expanding the rings comprise a conical element coaxial with said axis, forming the central portion of said first mold half, the base of said element comprising a portion of said mating surface of said first half, an internal conical surface associated with the innermost ring of said rings and mating with the conical surface of said element, and resilient means impelling said element into a projected position in relation to the other portion of said mating surface of said first mold half.

7. A mold according to claim 6, in which each of said rings is split so as to be expandable.

8. A mold according to claim 1, in which there are ten said cavities and each ring has ten markings.

9. A mold according to claim 8, in which the ten markings are represented by the numbers 0, 1, 2 . . . 9.

10. A mold according to claim 8, in which said markings are represented by letters in a number equal to that of the cavities.

11. A mold according to claim 9, in which the rings have ten other additional markings in the intervals between the numbers, said other markings comprising letters so that the mold may be used with the letters or the numbers presented to the cavities.

12. A mold according to claim 1, in which each cavity has a fixed marking which differs from the fixed marking of each of the other said cavities.

13. A mold for injection molding, comprising two mold halves separable after each molding operation and having mating surfaces which define therebetween a plurality of molding cavities and injection channels opening into said cavities, a plurality of concentric split rings in a first of said mold halves rotatable about a reference axis perpendicular to said mating surfaces and forming portions of said cavities in positions equally spaced about said reference axis, each ring presenting to the interior of each cavity a marking that is different from those that it presents to the other cavities, means to rotate one of said rings by increments so that its markings are presented, one by one, to said cavities, and to rotate each other ring by an increment each time the previous ring completes a revolution, actuating means to actuate said rotating means by an increment for each cycle of separation and approximation of said mold halves and means to expand said rings to be tightly pressed against each other when said two mold halves are approximated with their said mating surfaces in contact with each other.

14. A mold according to claim 13, in which said means for expanding said split rings comprise a conical element coaxial with said axis, forming the central portion of said first mold half, the base of said element comprising a portion of said mating surface of said first half, an internal conical surface associated with the innermost ring of said rings and mating with the conical surface of said element, and resilient means impelling said element into a projected position in relation to the other portion of said mating surface of said first mold half.

15. A mold according to claim 13, in which each cavity has a fixed marking which differs from the fixed marking of each of the other said cavities.

* * * * *